Figure 1:
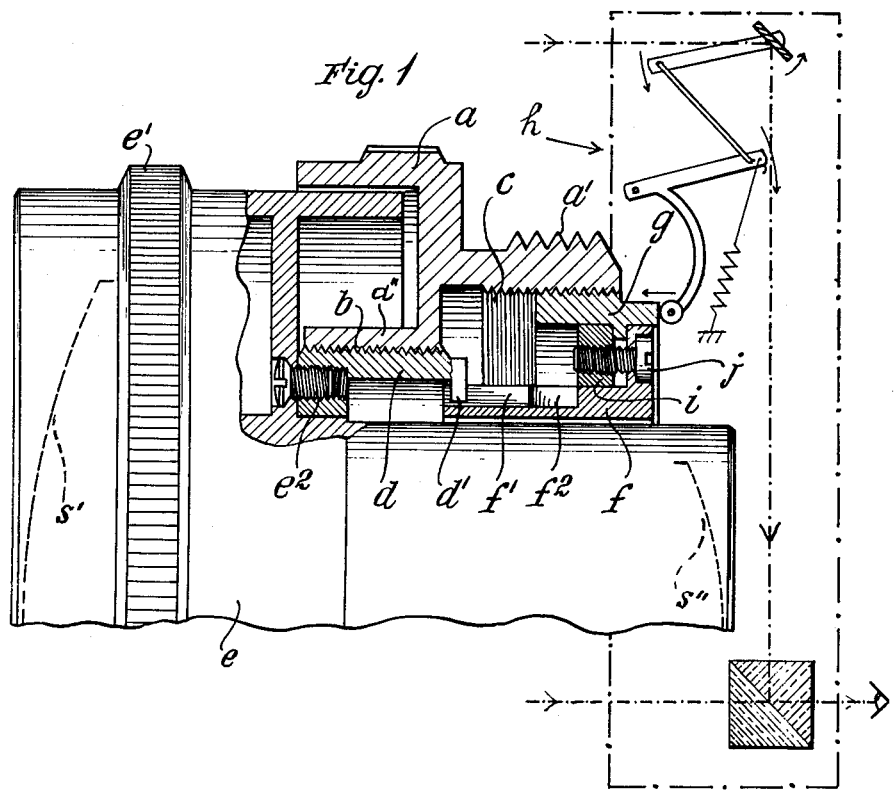

INVENTOR:
Karlheinz RAAB
BY
AGENT

United States Patent Office 3,005,393
Patented Oct. 24, 1961

3,005,393
PHOTOGRAPHIC OR CINEMATOGRAPHIC OBJECTIVE WITH RANGE-FINDER CONTROL
Karlheinz Raab, Kreuznach, Rhineland, Germany, assignor to Jos. Schneider & Co., Optische Werke, Kreuznach, Rhineland, Germany, a corporation of Germany
Filed Feb. 3, 1959, Ser. No. 790,948
Claims priority, application Germany Feb. 5, 1958
5 Claims. (Cl. 95—44)

My present invention relates to a photographic or cinematographic objective having means for controlling a range finder by the axial focusing displacement of a lens carrier.

The provision of a positive coupling between the focusing mechanism of the objective and a conventional range finder enables accurate instantaneous focusing of an ordinary single-objective camera without the insertion of a ground-glass plate. Since, however, the operating stroke of a range finder generally differs from and often considerably exceeds that of a camera, special coupling means must be provided for translating a given axial displacement of the camera lens barrel into a different, usually greater axial displacement of the actuating element of the range finder. Moreover, the operating range of the finder may be more limited than that of the camera, extending for example from infinity to a minimum distance of about 1 meter or approximately 3 feet. If it were desired to maintain the adjustability of a camera for closer distances, conventional couplings would require the provision of additional space within the objective to accommodate the actuating element of the finder in positions lying outside the operating range of the latter. This would necessitate considerable changes in existing range finders and, furthermore, would add to the size, weight and cost of the objective.

The general object of my present invention is to provide an improved coupling between the focusing mechanism of an adjustable camera objective and an associated range finder which avoids the inconveniences set out above.

More particularly, it is an object of my invention to provide means for positively coupling the focusing mechanism with the finder throughout the operating range of the latter and for effectively decoupling the finder from the objective at the proximal end of such range, thereby enabling further adjustment of the camera over an extended focusing range.

In accordance with this invention I provide, between the actuating element of a range finder and the focusing element of a camera, a coupling member positively interconnecting these two elements with a transmission ratio different from unity throughout a portion of the operating stroke of the focusing element but releasing the actuating element of the finder in a limiting position of the latter so as to enable free continued displacement of the focusing element over the remainder of its stroke. The finder-actuating element advantageously takes the form of a rotatable and axially slidable ring concentrically surrounding the lens barrel, this ring as well as the barrel being rotatably coupled with the objective housing via threads of different pitch.

Figure 2:
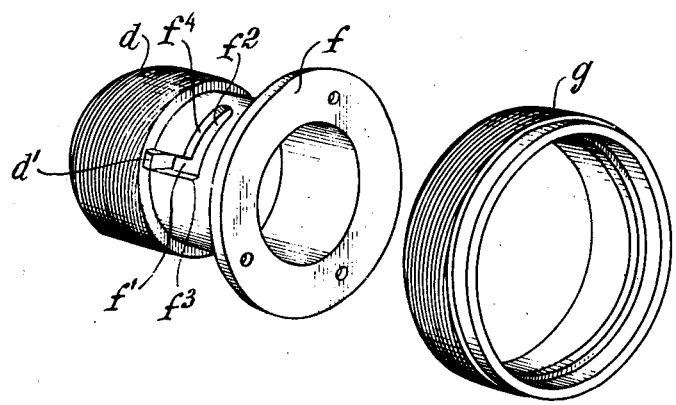

The invention will be described in greater detail with reference to the accompanying drawing in which:

FIG. 1 shows, partly in elevational and partly in axial section, one half of an objective embodying the invention; and FIG. 2 is an exploded perspective view of a coupling according to my invention.

The objective shown in the drawing comprises a cylindrical housing $a$ having a rearward projection with male threads $a'$ for connecting it to a camera not shown. An internal boss $a''$ of the housing is provided with threads $b$ mating with complementary threads on a supporting ring $d$ for the lens barrel $e$ of the objective. Element $e$ acts as a carrier for a system of lenses whose first and last refractive surfaces have been indicated in dotted lines at $s'$ and $s''$. This element, which is rotatable with the aid of a knurled ridge $e'$, is rigidly secured to ring $d$ by means of screws $e^2$ (only one shown).

The externally threaded rear portion of housing $a$ also carries internal threads $c$ mating with complementary threads on an annular actuating element $g$ for a conventional range finder $h$. Element $g$ is adjustably but rigidly connected with a coupling ring $f$ by means of screws $j$ (only one shown) and a clamping ring $i$ engaged thereby.

The coupling ring $f$ is provided with a generally L-shaped groove having an axially extending branch $f'$ and a substantially peripherally extending branch $f^2$. A dog $d'$, integral with supporting ring $d$, projects into this groove and transmits any rotation of unit $d$, $e$ to the coupling ring $f$ through its co-operation with the axial branch $f'$ of the groove. When, however, the parts have moved into a position in which dog $d'$ registers with the transverse branch $f^2$, the follower assembly $f$—$j$ is released as the controlling unit $d$, $e$ moves through another fraction of a circle to the extent permitted by the length of this groove portion.

If the position of the parts shown in FIG. 1 represents a focusing of the camera at or near infinity, it will be possible to adjust the objective to closer distances by rotating the lens barrel $e$ and with it the supporting ring $d$ thereof in a sense which is counterclockwise as viewed in FIG. 2; the lens barrel then moves toward the left in FIG. 1, as does the ring $f$ which is positively entrained for rotary motion by the engagement of dog $d'$ with groove portion $f'$. As the pitch of threads $c$ is larger than that of threads $b$, the follower unit $f$, $g$ advances more rapidly toward the left than does the lead member $d$ whereby the dog $d'$ will eventually be overtaken by the transverse groove portion $f^2$. This occurs preferably at the very moment when the finder $h$ has reached the proximal limit of its range (e.g. 1 meter). Further rotation of the lens barrel $e$ in the same sense, e.g. to a position corresponding to an object distance of 0.5 meter or about 1½ feet, will not change the position of the finder $h$ or of its control element $g$. When, subsequently, the sense of rotation of lens carrier $e$ is reversed, the dog $d'$ will eventually strike the forward edge $f^3$ of groove portion $f'$ and will thereupon entrain the coupling ring $f$ in the opposite sense toward the position illustrated in FIG. 1.

It should be noted that, with the members $d$ and $g$ arranged to move in the same sense but at different speeds, the groove portion $f^2$ must be undercut so that its left-hand edge $f^4$ encloses an acute angle with the generatrices of the cylindrical member $d$ and, therefore, with the axial groove branch $f'$; thus, edge $f^4$ may extend along a helical line whose pitch is equal to or greater than that of threads $b$ but of opposite sign with respect thereto. This is necessary in order to prevent the dog $d'$ from jamming in the branch $f^2$ as the ring $d$ continues its leftward advance after the ring $f$ has come to a stop. Naturally, such precaution would not be necessary in a system in which the two rings were arranged to move in opposite directions.

The difference in pitch between the threads $b$ and $c$, which determines the relative speeds of members $d$ and $g$, will depend upon the ratio of the operating strokes of the lens barrel $e$ and of the focusing element of finder $h$ between the limits of a given range of distances; this ratio may be as high as, for example, 1:6.

I claim:

1. In a camera objective, in combination, a housing having first and second threads of different pitch, a lens barrel axially movable in said housing, a rotatable member matingly engaging said first threads and operatively coupled with said lens barrel for controlling the axial movement thereof, a range finder, a control element for said range finder matingly engaging said second threads, and a coupling member rigid with said control element coupled with said rotatable member for simultaneous rotation over a range of adjustment of said range finder while being decoupled therefrom in a terminal position of range-finder adjustment, one of said members being provided with a generally axially extending groove, the other of said members being provided with a projection positioned to engage said groove over a fraction of the range of displacement of said rotatable member, said groove having on one side a generally transverse extension accommodating said projection in said terminal position to enable further rotation of said rotatable member without entrainment of said coupling member and said control element.

2. The combination according to claim 1 wherein said groove is provided on said coupling member.

3. The combination according to claim 1 wherein said terminal position corresponds to the proximal operating limit of said range finder.

4. The combination according to claim 1 wherein said second threads have a pitch greater than that of said first threads.

5. In a camera objective, in combination, a housing having first and second threads of different pitch, a lens barrel axially movable in said housing, a rotatable member matingly engaging said first threads and operatively coupled with said lens barrel for controlling the axial movement thereof, a range finder, a control element for said range finder matingly engaging said second threads, and a coupling member rigid with said control element coupled with said rotatable member for simultaneous rotation over a range of adjustment of said range finder while being decoupled therefrom in a terminal position of range-finder adjustment, said coupling member concentrically surrounding said lens barrel and being provided with a substantially L-shaped groove including a generally axial branch and a generally transverse branch, said rotatable member being provided with a projection extending into said groove and engaging said axial branch over a major part of the displacement stroke of said rotatable member, said projection thereafter engaging said transverse branch upon arrival of said control element in said terminal position to enable further rotation of said rotatable member without entrainment of said coupling member and said control element.

References Cited in the file of this patent

UNITED STATES PATENTS 2,440,344    Montgomery _____ Apr. 27, 1948

FOREIGN PATENTS 710,967    Great Britain _____ June 23, 1954